Feb. 20, 1968 C. P. DE BIASI 3,369,360
HYDRAULIC PROPULSION AND BRAKING SYSTEM
FOR VEHICLES OR THE LIKE
Filed Nov. 18, 1965 10 Sheets-Sheet 1

FIG. 1

INVENTOR
Charles P. de Biasi
BY
ATTORNEY

Feb. 20, 1968

C. P. DE BIASI

3,369,360

HYDRAULIC PROPULSION AND BRAKING SYSTEM
FOR VEHICLES OR THE LIKE

Filed Nov. 18, 1965

INVENTOR
Charles P. de Biasi
BY
Robert Ned Kohey
ATTORNEY

Feb. 20, 1968 C. P. DE BIASI 3,369,360
HYDRAULIC PROPULSION AND BRAKING SYSTEM
FOR VEHICLES OR THE LIKE
Filed Nov. 18, 1965 10 Sheets-Sheet 7

INVENTOR
Charles P. de Biasi
BY
ATTORNEY

United States Patent Office 3,369,360
Patented Feb. 20, 1968

3,369,360
HYDRAULIC PROPULSION AND BRAKING
SYSTEM FOR VEHICLES OR THE LIKE
Charles P. de Biasi, 74 Braman Road,
Waterford, Conn. 06385
Filed Nov. 18, 1965, Ser. No. 509,263
18 Claims. (Cl. 60—19)

ABSTRACT OF THE DISCLOSURE

This invention relates to a hydraulic propulsion and braking system for vehicles or the like in which pressurized fluid is delivered to a hydraulically driven wheel in response to operator manipulation of controls. Pressurized fluid may be delivered through either of parallel circuits to drive the fluid powered wheel in either a forward direction or a reverse direction. Controls for the prime mover and the pump are provided and are interrelated through an operation of an accelerator to control the speed and torque of the fluid powered wheels. The vehicle with which the system is associated is braked by restricting the effective size of the passageway leading from the fluid powered wheels to a reservoir by the use of a valve associated with a brake pedal.

---

This invention relates generally to vehicle propulsion and braking systems and is more particularly concerned with a novel fluid transmission system, method, arrangement, mechanism and apparatus adapted for propelling and braking powered land or water-supported vehicles of any type forwardly and in reverse, whether such vehicle is movable on wheels, endless tracks, boat hulls, or any other suitable means, or a combination thereof.

It is, therefore, a primary object of the present invention to provide a hydraulic system, method, arrangement, mechanism and apparatus for a vehicle having hydraulically operable driving means that is so constructed and arranged as to be usable both for propelling and for braking said vehicle driving means.

Another primary object of this invention, in addition to the foregoing objects, is to provide such a hydraulic system, method, arrangement and apparatus for such a vehicle that is so constructed and arranged as to enable the propulsion and braking of the vehicle driving means to be controlled manually.

Yet another primary object of the present invention, in addition to each of the foregoing objects, is to provide a multidirectional drive hydraulic transmission system, method, arrangement, mechanism and apparatus for a vehicle having hydraulic motor means driven by a variable displacement pump in turn driven by the vehicle engine, which is so constructed and arranged that both the pump and the engine are both simultaneously under manual control and the transmission is selectively directionally conditioned and responsive to an electric circuit comprising the ignition control circuit for the engine.

An additional primary object of this invention, in addition to each of the foregoing objects, is to provide a hydraulic transmission system, arrangement, mechanism, apparatus and method for propelling a vehicle having a propulsion engine driving a variable displacement pump unit operable to drive propelling hydraulic motor means, which is so constructed and arranged that the speed of the propulsion engine and the volume and flow of hydraulic fluid to the hydraulic motor means are controllable simultaneously by common manually operable means.

A further primary object of the present invention, in addition to each of the foregoing objects, is to provide a hydraulic transmission system, arrangement, mechanism and apparatus for propelling a vehicle comprising a propulsion engine and a variable displacement pump unit which are both simultaneously and commonly controllable by single manually operable means and is so constructed and arranged as to be usable also for the braking of the vehicle.

A still further primary object of this invention in addition to each of the foregoing objects, is to provide such a hydraulic transmission system, arrangement, mechanism and apparatus which is so constructed and arranged as to be usable for the braking of the vehicle through either a foot brake or a parking brake.

In addition, it is a primary object of the present invention, in addition to each of the foregoing objects, to provide a hydraulic system, arrangement, mechanism and apparatus for propelling a vehicle comprising a propulsion engine and a variable displacement pump unit which are both simultaneously controllable by a mechanical linkage arrangement having separate camming or lever assemblies for positioning the engine's accelerator control and for positioning the pump's displacement control.

Other objects, advantages and important features of this invention will be apparent from a study of the specification following, taken with the drawings which together describe, disclose, illustrate and show certain embodiments of the invention and what is now considered and believed to be the best mode of practicing the principles thereof. Still other embodiments, modifications, procedures or equivalents may occur to those having the benefit of the teachings herein, and such other embodiments, modifications, procedures or equivalents are intended to be reserved especially as they fall within the scope and breadth of the subjoined claims.

In FIGURES 7, 9, 11, 13, 15 and 17, the feed or pressure line of the hydraulic system under various operating conditions are indicated in solid lines; the return or suction lines are indicated in phantom (dotted) lines; and the non-functioning lines or conduits are shown by a dot-dash line. The electrical circuit shown in FIGURES 10, 12, 14, 16 and 18 are associated with the above figures and illustrate functioning or "live" conductors in solid lines and non-functioning or "open" conductors in phantom (dotted) lines.

With reference now to the drawings, and particularly to FIGURES 1 to 5, there is shown therein a vehicle having a prime mover 20 which may be of any suitable type, such as a conventional internal combustion engine, diesel engine, gas turbine, or the like. The prime mover 20 directly drives through a suitable coupling a variable displacement hydraulic pump device 22 of any suitable or conventional construction, wherein the output of the pump, at a given pump displacement, is proportional to the output of the prime mover. This pump 22 preferably is a unit having a variable displacement from zero to maximum fluid flow always in one direction. There is no need for reversing the flow direction of the pump since this is accomplished by a suitable 4-way open center solenoid valve 24, as will be described hereinafter in greater detail. The pump 22 can be a vane type, axial piston type or any other suitable type of pump, provided it can be controlled by a lever or the like in a manner also to be described hereinafter.

The engine or prime mover 20 is suitably controlled by generally conventional means including a throttle control lever 26 directly connected by a suitable linkage 28 including a cam 29 to a manually operable, pivoted accelerator-control foot pedal 30 having a suitable standardized return device or spring (not shown). The prime mover 20 preferably is provided with a suitable governor (not shown) to limit its speed to a predetermined maximum value, and the throttle control lever 26 may be suitably equipped with a return device such as a spring (not shown) for returning the engine or prime mover 20 to idling speed.

The pump 22 is provided with a pump displacement control lever 32 directly connected by a suitable linkage 34 including a lever 35 to the foot accelerator pedal 30. The suction line intake of the pump 22 is shown as conduit 36 and is in communication with a fluid reservoir 38. The pressure feed line, discharge or output line of the pump 22 is shown as conduit 40, and at the opposite end of conduit 40 and connected thereto is the 4-way open center solenoid valve 24 (see FIGURE 1).

Each of the wheels 42 and 44 of the vehicle is provided with a hydraulic driving motor (not shown) directly associated therewith and preferably built into the wheel structure so as to comprise an integral component thereof. Such hydraulic or fluid operated torque wheels preferably are of the type disclosed in my copending United States application, Ser. No. 397,740, filed Sept. 21, 1964, now U.S. Letters Patent 3,280,934, and entitled, "Auto Kinetic Wheel or Fluid Motor." It is believed that no further description of the specific construction of the fluid operated torque wheels 42 and 44 is required for an understanding of the present invention, except to mention that they are of a type which can be reversibly driven.

Connected between the 4-way solenoid valve 24 and the fluid operated torque wheels 42 and 44 are two separate hydraulic fluid conduits 46 and 48 which are connected to the 4-way solenoid valve 24 and at one end are connected at the opposite end to a pair of conduits 50 and 52, respectively, at a point intermediate the length of the latter. Conventional open-close orifice valves 54 and 56 of any suitable construction are provided in the conduits 46 and 48, and are for use as parking brakes as will be described hereinafter. The orifice valves 54 and 56 are controlled by a suitable manually operable hand crank or lever 58 which selectively opens and closes the orifices of the valves. By closing the valves 54 and 56, the conduits 46, 48, 50 and 52, and the wheels 42 and 44 are cut off from the pump 22 to thus render that portion of the hydraulic system a closed or "bottled" circuit and preclude the wheels 42 and 44 from being driven or from turning.

A branch conduit 60 (FIGURE 1) is connected to the conduit 40 intermediate the pump 22 and the 4-way solenoid valve 24, and is provided with a one-way check valve 62 of any suitable type. When the vehicle is free wheeling, for example, the fluid operated torque wheels 42 and 44 act as pumps and will thus pump fluid from the reservoir 38 through branch conduit 60, since the check valve 62 is constructed to permit fluid flow in such a direction. In such a condition, the fluid is pumped through the 4-way solenoid valve 24, through the fluid operated torque wheels 42 and 44, back toward the reservoir 38 through conduits 48 and 64 to a brake valve arrangement 66 and then to return conduit 68 which feeds back into the reservoir 38, in a manner which will be more apparent from the description hereinafter.

Figure 1:
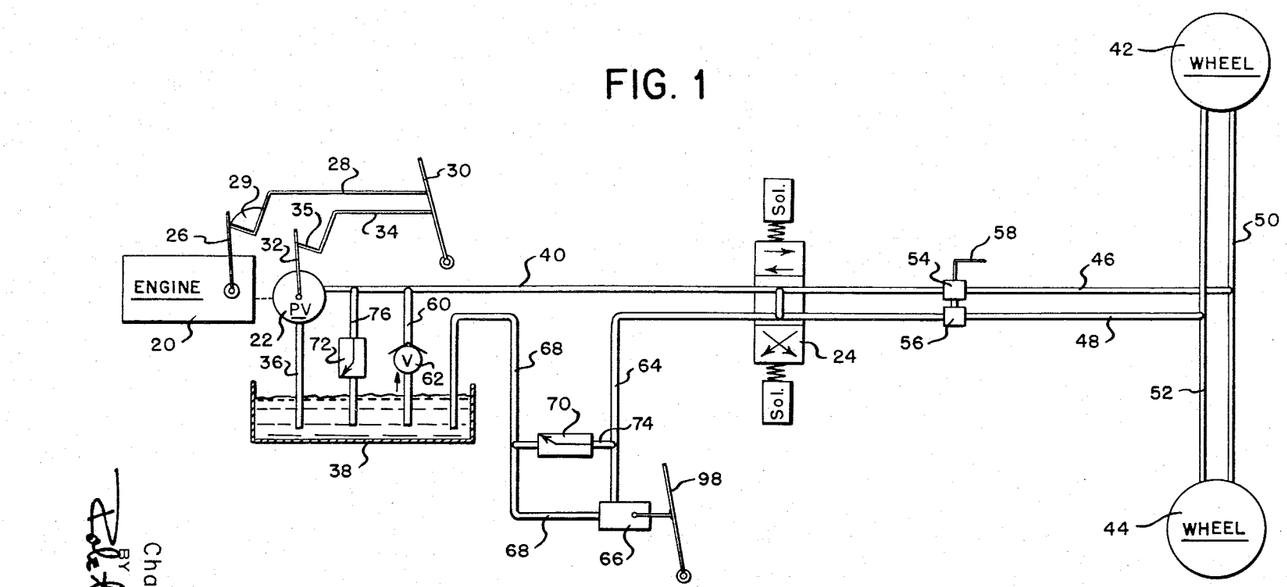
FIGURE 1 is a diagrammatic showing of a hydraulic drive transmission system constructed in accordance with the principles of the present invention and adapted, by way of example and for the sake of simplification, to a two-wheel drive vehicle.

As shown in FIGURE 1, a pair of relief valves 70 and 72 are respectively provided with conduits 74 and 76. Conduit 74 is disposed across the brake valve arrangement 66 between conduits 64 and 68, and conduit 76 is in communication with the reservoir 38 and connected to conduit 40 between branch conduit 60 and the pump 22. The relief valve 72 is of any suitable type and serves to protect the pump 22 and the remainder of the system against an excessive pressure build-up, and relief valve 70 is provided to protect the system against undue pressure during braking operations.

Figure 3:
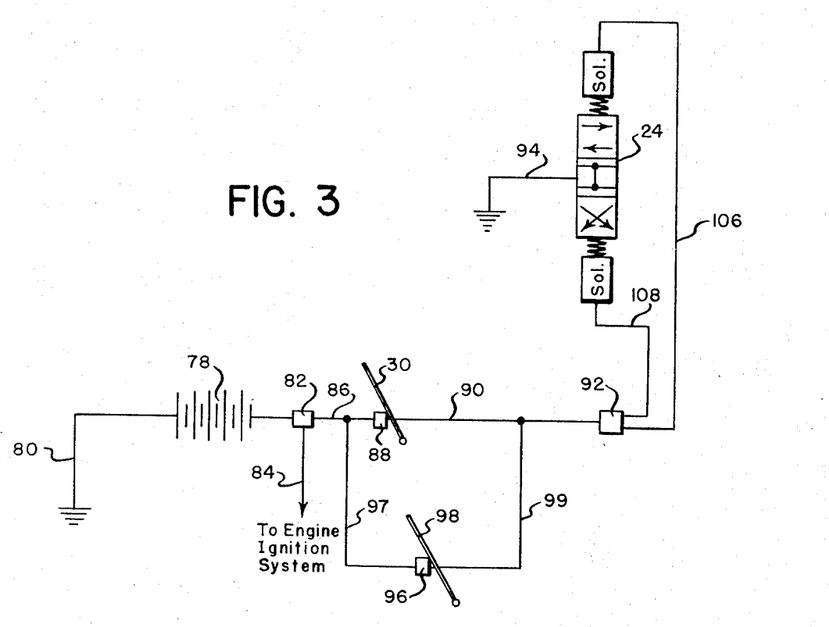
FIGURE 3 is a diagramamtic showing of electrical control circuits correlated to and controlling the vehicle hydraulic transmission system of FIGURE 1 to effect forward and reverse drive of the vehicle.

Referring now to the electrical control circuit of FIGURE 3, in connection with the hydraulic system of FIGURE 1, a conventional storage battery is shown at 78 having a ground connection 80 to one of its terminals. The other terminal is connected to a conventional ignition switch 82 which is connected to the engine ignition system by conductor 84. A conductor 86 connects the ignition switch 82 with a master contact switch 88 that is actuatable by the accelerator foot pedal 30 when it is initially manually depressed. Actuation or closing of the master contact switch 88 closes a circuit via conductor 90 to a double throw switch 92 which is manually selectively operable to energize either side of the 4-way solenoid valve 24 through the conductors 106 or 108. It is noted that the 4-way solenoid valve 24 is grounded at 94. A second contact switch 96 is mechanically actuatable or closable by the downward movement of the brake foot pedal 98 to close a circuit which also energizes one of the solenoids in the 4-way valve 24, depending upon the position of the switch 92. Contact switch 96 is electrically connected in parallel with accelerator pedal contact switch 88 by conductors 97 and 99. As an illustrative example, contact switch 96 is similar to the type of switch which is normally utilized to energize the stop lights of a conventional vehicle.

Figures 4, 5:
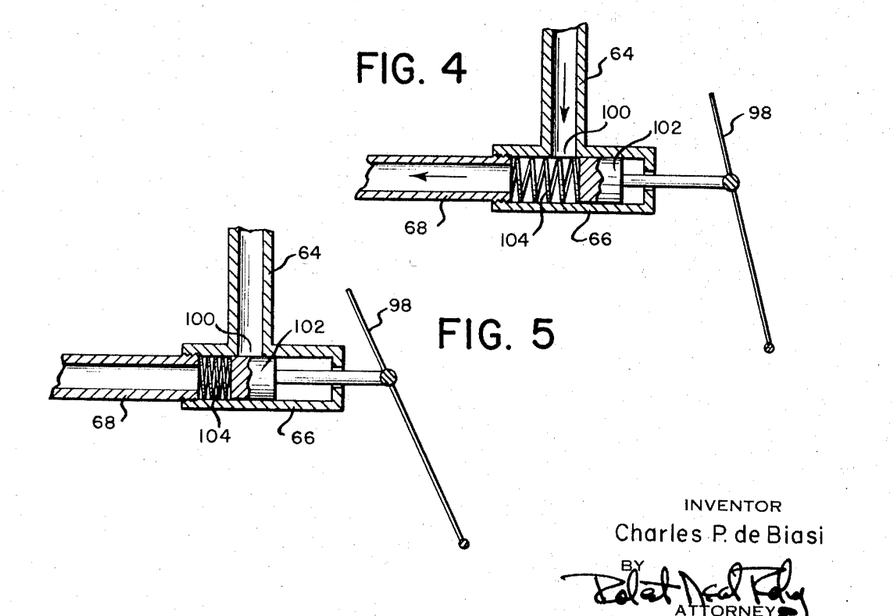
FIGURE 4 is a greatly enlarged fragmentary view diagrammatically illustrating the braking valve of the instant system in an open condition.
FIGURE 5 is a view similar to FIGURE 4, diagrammatically illustrating the braking valve in a closed position.

As best shown in FIGURES 4 and 5, an orifice 100 in the brake valve 66 is closed by a slidable piston 102 connected to the brake pedal 98 when the pedal 98 is depressed, and a biasing spring 104 serves to urge the piston 102 to a position which opens the orifice 100 and permits fluid to pass through the valve 66. The brake pedal 98 may also be provided with a suitable spring (not shown) to return it to a neutral or full open position.

Conductors 106 and 108 connect the manually operable double throw switch 92 to opposite sides of the 4-way solenoid valve 24. It should be noted that the 4-way solenoid actuated valve 24 hereinbefore referred to is not illustrated in detail since it is conventional and well known to those skilled in the art. The same is true of the various other components of the hydraulic propulsion system of the instant invention, such as the switches, valves, etc.

The manner in which the hydraulic transmission system of this invention operates is as follows:

Referring to FIGURES 1, 2a through 2e and 3 through 5 of the drawings, the engine 20 of the vehicle is first started in the usual manner by closing the ignition switch 82 to energize a conventional engine ignition system thereof (not shown) through the battery 78 and the conductors 80 and 84. This is the only portion of the circuitry in FIGURE 3 thus far actuated, since the accelerator switch 88 and the brake switch 96 are open and the conventional 4-way solenoid valve 24 is in the neutral centered position. The engine 20 thus runs at idling speed and the pump 22 is also turning at idling speed, since it is directly connected to the engine 20 by means of a conventional coupling. Since the pump 22 is in neutral it does not pump any fluid. If the pump 22 did pump any fluid at this point, the fluid would only flow back to the reservoir 38, since the 4-way valve 24 is of the open center type. This condition is best shown diagrammatically by FIGURES 17 and 18.

Figure 2A:
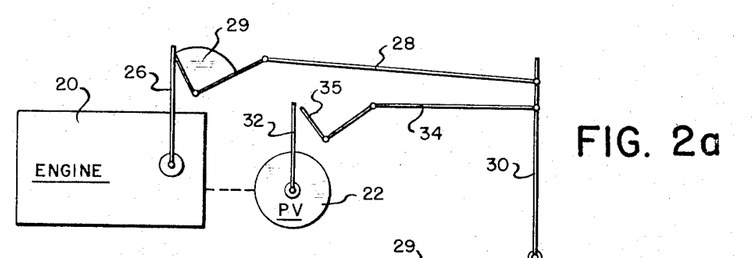
FIGURES 2a through 2e are fragmentary diagrammatic views of a portion of the hydraulic drive transmission shown in FIGURE 1, namely, the manually operable engine and pump controls, illustrating the various operating conditions.

FIGURE 2a illustrates in greater detail the position of the accelerator cam 29 and lever 35 at the above condition. Cam 29 is in contact with, but has not moved the throttle control lever 26, and the lever 35 is spaced apart from the pump displacement control lever 32, thereby enabling the engine 20 to remain at idling speed.

Figures 2B, 2C:
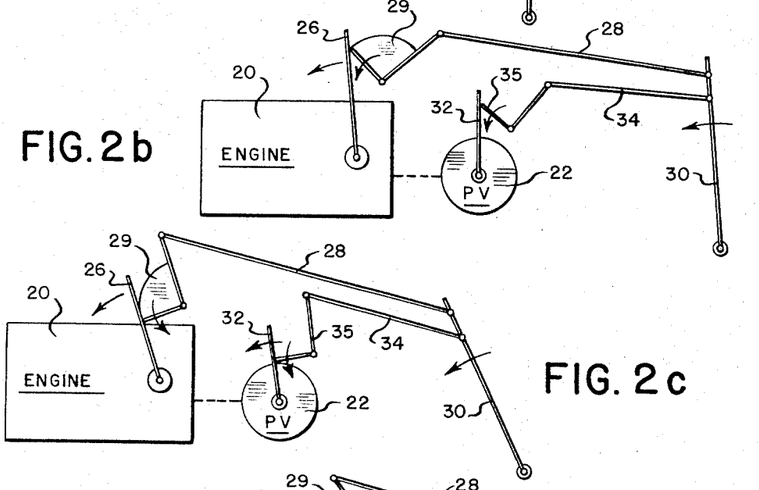

Assuming that forward drive of the vehicle is desired by the operator, he first positions the double throw switch 92 adapted to close a circuit and thus to energize one of the solenoids of the valve 24, thereby enabling the valve 24 to direct fluid in a predetermined manner for forward operation of the fluid operated torque wheels 42 and 44. The operator then exerts foot pressure on the accelerator control pedal 30 which moves throttle control lever 26 to increase the rotational speed of the engine 20. FIGURE 2b illustrates the condition when the engine 20 reaches a speed sufficient to start to cause the vehicle to travel forward. The pump lever 32, however, is still in its neutral position and thus the pump 22 is not pumping any fluid.

As the operator continues to depress the accelerator control foot pedal 30, contact switch 88 is actuated to close a circuit through conductor 90 to the double throw switch 92, which has already been manually actuated by the operator to a position for forward travel. A circuit is closed, therefore, to the 4-way solenoid valve 24 to energize one of its solenoids and cause it to assume a forward flow position. In addition, the pump displacement control lever 32 is simultaneously moved slightly away from neutral and into a minimum pumping position as the accelerator control foot pedal 30 is further depressed. The vehicle now starts to travel forward as a result of this increased pressure applied by the operator to the accelerator pedal 30.

Figure 6:
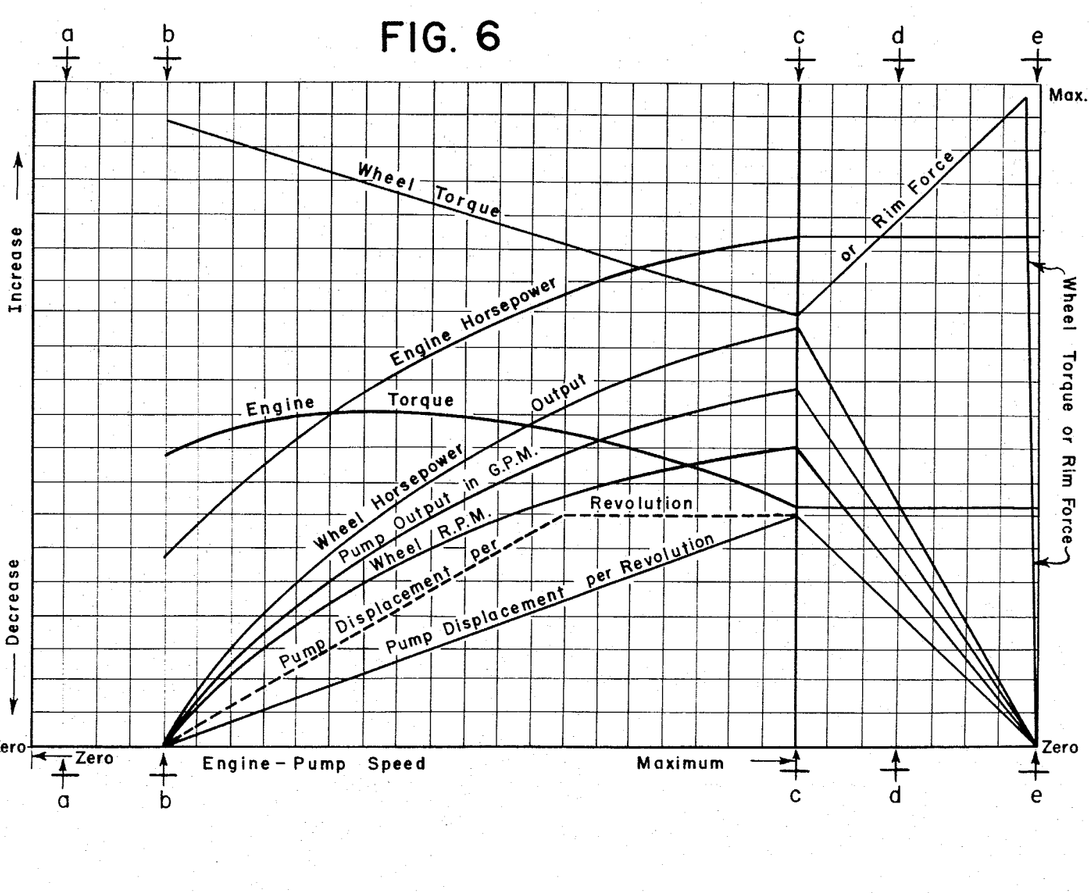
FIGURE 6 illustrates graphs showing the operating characteristics of various components involved in the instant hydraulic propulsion system.
Figures 7, 8:
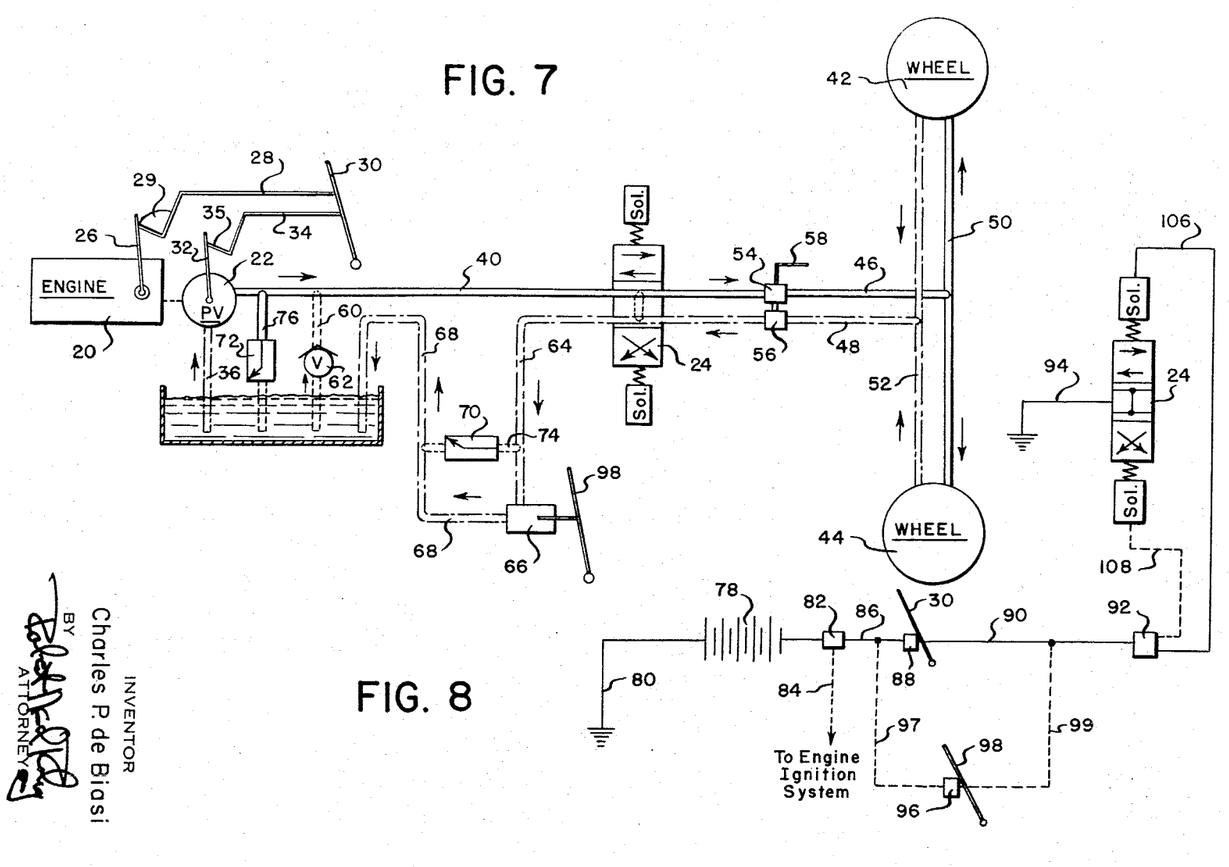
FIGURE 7 is a diagrammatic view similar to FIGURE 1 showing the hydraulic transmission components in a condition for forward drive.
FIGURE 8 is a diagrammatic showing of electrical control circuits correlated to and controlling the vehicle hydraulic transmission system when the vehicle is in the forward drive as shown in FIGURE 7.

The foregoing and following conditions can best be demonstrated with the aid of the graph shown in FIGURE 6, which illustrates characteristic curves that are basically those of a diesel engine, but which also are exemplary of the characteristics exhibited by the hydraulic propulsion system of the instant invention when embodying an internal combustion engine as the prime mover.

When the prime mover or engine 20 and pump 22 are advanced from the condition shown in FIGURE 2 in the direction of the condition as represented by FIGURE 2c, FIGURE 6 demonstrates that the pump displacement, wheel r.p.m., pump output in g.p.m. and wheel horsepower are at a minimum. The engine horsepower, however, is sufficient to power the vehicle and wheel torque is at a maximum, while engine torque is close to maximum. No further characteristics are necessary to put the vehicle into motion or to enable it to accelerate.

As the operator increases foot pressure by further depressing the accelerator control foot pedal 30, the vehicle then reaches the condition shown in FIGURE 2c. This condition is represented at the vertical line c of FIGURE 6, and at this condition, engine speed, wheel r.p.m., engine horsepower and pump output in g.p.m. are at their maximum. Pump displacement may also be at its maximum at this point, although it can occur anywhere between line c and the point of maximum torque, as illustrated by the dotted line of FIGURE 6. This condition represents the vehicle traveling at its maximum speed, although both engine torque and wheel torque will have decreased. However, at this condition, it is not essential to have maximum torque.

Assuming now that the vehicle has reached a steep hill, and is under the condition represented in FIGURE 2c and line c of FIGURE 6. The vehicle begins to lose speed since the system is not developing enough torque in the fluid operated torque wheels 42 and 44. To overcome this loss of speed, the operator continues to depres the accelerator control foot pedal 30 so that the system moves toward the condition represented by FIGURE 2d and line d of FIGURE 6. At this condition, and because the engine cam 29 has a curved surface with a radius equal to that of the leading edge of the cam, engine horsepower and engine torque as well as engine speed will remain at a constant value (from line c to line e of FIGURE 6). However, wheel torque increases from that as represented at line c, because the lever 35 has gone beyond a normal angle to cause the pump displacement control lever 32 to move backward toward an idling position. The pump displacement thus is decreasing, and with this decrease, there is a corresponding decrease in wheel r.p.m., pump output in g.p.m. and wheel horsepower.

Figures 2D, 2E:
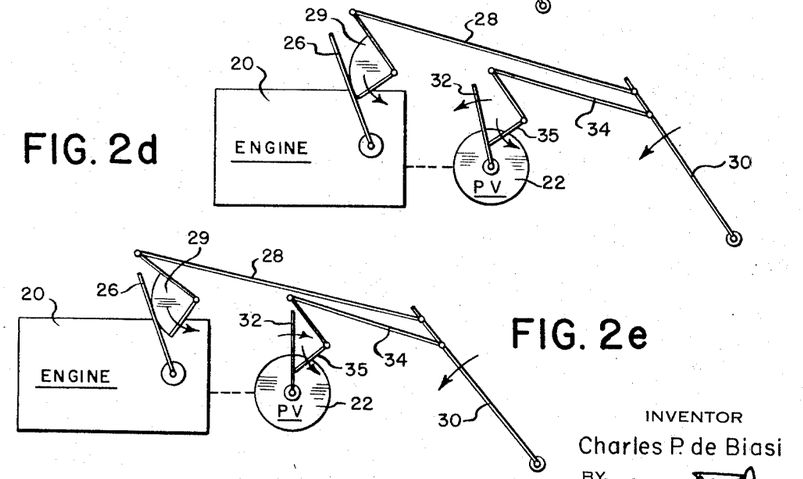

As the operator continues to depress the accelerator control foot pedal 30 to the condition represented by FIGURE 2e and line e of FIGURE 6, and just before reaching this condition, the entire system will be at a condition which exhibits maximum engine horsepower and high engine torque, whereas pump displacement, pump output in g.p.m., wheel r.p.m. and engine horsepower will be approaching zero.

If the operator then depresses the accelerator control foot pedal 30 to the position shown in FIGURE 2e, as shown at line e of FIGURE 6, the engine will then be at maximum speed and also at high torque. The pump 22, however, being in neutral, will not pump or feed any fluid to the system. The system is now basically akin to a closed "loop" or circuit, and the vehicle will come to a complete stop and will automatically be braked since the wheels 42 and 44 cannot pump fluid through the pump 22 when the pump is in neutral.

Once the operator releases his pressure on the accelerator control foot pedal 30, the vehicle starts to travel at a very slow speed with maximum wheel torque, because the pump lever 32 is again advanced by the lever 35. If the operator completely removes his foot from the accelerator control foot pedal 30 while the vehicle is so travelling in a forward direction, the contact switch 88 will immediately be disconnected or opened and the 4-way solenoid valve 24 will assume an open center position. The fluid operated torque wheels 42 and 44 will then act as pumps, but since the 4-way valve 24 is in the open center position, the wheels simply circulate fluid through the 4-way valve 24 and back to themselves. The vehicle is now in what is considered to be a "free-wheeling" condition and this is best shown by the hydraulic and electrical circuits of FIGURES 11 and 12. It is possible that the fluid operated torque wheels 42 and 44 might circulate the fluid either from the reservoir 38 shown in FIGURE 11 or through the valve 24, whichever offers the least resistance.

Another important feature of the hydraulic propulsion system of the instant invention is the ability of the system to lend itself not only to emergency or parking brakes but also to "traveling" brakes. In this connection, it is assumed the vehicle is in forward motion and the operator removes his foot from the accelerator control foot pedal 30, this action will disconnect the contact switch 88 and the vehicle will be left in a "free wheeling" condition as described hereinbefore. The system is now again represented by FIGURE 2a and line a of FIGURE 6, wherein the engine 20 is idling, the pump 22 is in a neutral or no pumping position and the fluid operated torque wheels 42 and 44 are circulating the fluid through the 4-way solenoid valve 24 and back again in a "closed loop" fashion.

Figures 13, 14:
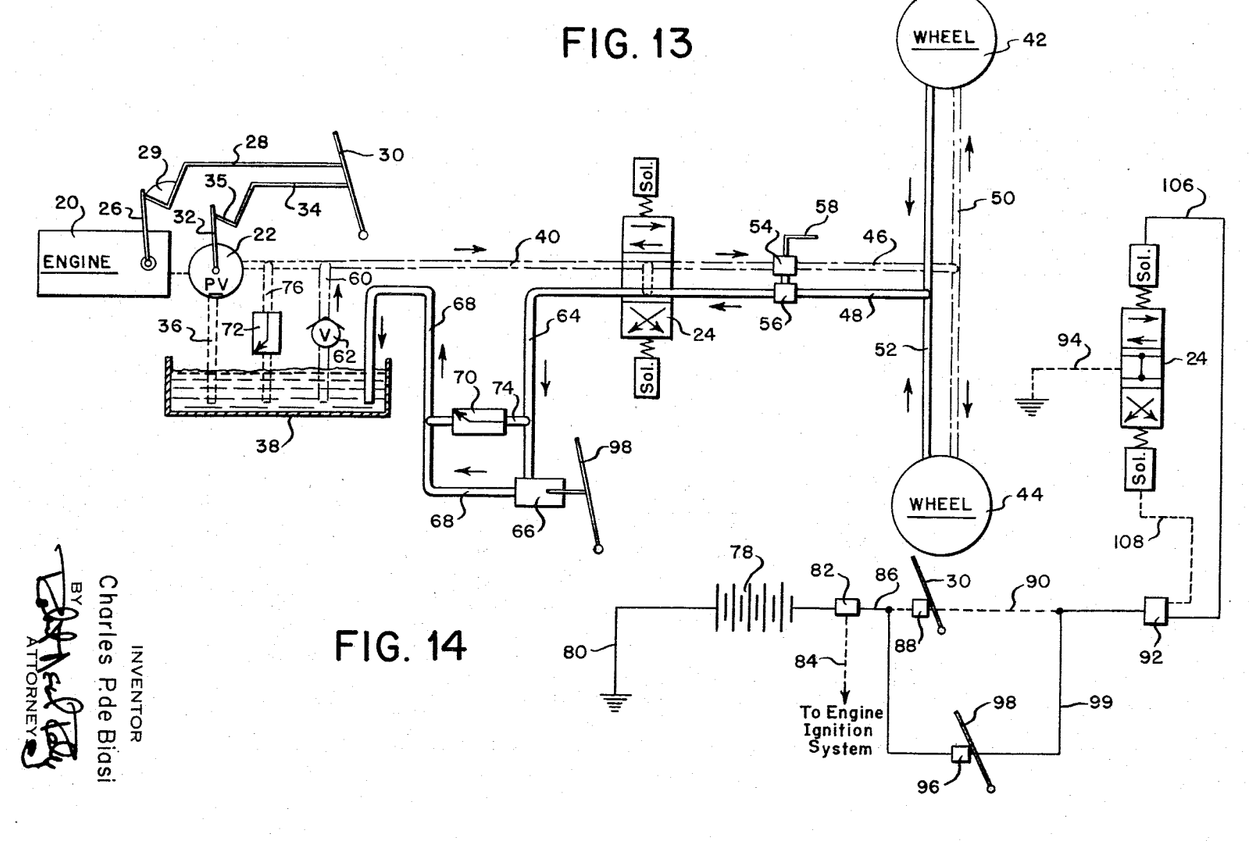
FIGURE 13 is a diagrammatic view similar to FIGURE 7, showing the hydraulic transmission components in a condition for forward travel and foot-braked.
FIGURE 14 is a diagrammatic showing of electrical control circuits correlated to and controlling the vehicle hydraulic transmission system when the vehicle is traveling forward while being foot-braked as shown in FIGURE 13.

When the operator wishes to stop the vehicle, he applies pressure to the brake foot pedal 98 which closes the switch 96 and energizes the same solenoids of the 4-way valve 24, since the double throw switch 92 is still in its original position for forward movement. The fluid operated torque wheels 42 and 44, acting as pumps, will pump fluid from the reservoir 38 through conduit 46, since the check valve 62 is disposed to permit this desired direction of fluid flow. The fluid thus flows through the 4-way valve 24, the whels 42 and 44, through conduits 48 and 64 to the brake valve arrangement 66 and then through the conduit 68 to reservoir 38. At this time, the vehicle is still in a "free wheeling" condition, but as the operator continues to depress the brake foot pedal 98, the orifice 100, as best shown in FIGURE 4, is gradually being restricted in size by the piston 102, which will in turn build up pressure in conduit 64 and the wheels 42 and 44. This build-up in pressure in the wheels 42 and 44 will tend to reduce the r.p.m. thereof. When the piston 102 reaches the position shown in FIGURE 5, orifice 100 will be completely closed off and the vehicle will come to a complete stop as the system is again in a closed loop or "bottled up" condition. FIGURES 13 and 14 illustrate the hydraulic and electrical circuits when the vehicle is being braked by the foot pedal 98 as the vehicle travels forwardly. Relief valve 70 will open at a predetermined pressure should the vehicle have excessive momentum or inertia and if the operator has applied too much pressure on the brake foot pedal 98. This safety feature will preclude the vehicle from going into a locked condition and perhaps a skid.

With the 4-way valve 24 energized into a forward flow direction, orifice 100 closed, and the vehicle on an upgrade, the vehicle will not move and will be braked because in this condition the fluid operated torque wheels 42 and 44 try to reverse the direction of fluid flow, i.e., conduit 64 tends to become the suction line and conduits 40 and 46 the discharge or return lines. Since the brake valve 66 is closed and check valve 62 will not permit flow in this direction, the system is still closed or "bottled up" and the vehicle cannot move in either the forward or reverse direction.

It should be noted that the accelerator control foot pedal 30, the brake foot pedal 98 and the ignition switch 82 are intended to be located in positions adjacent the operator of the vehicle for convenience and ease of operation, and both the foot pedals 30 and 98 can be of the power assisted type similar to conventional power brakes or power steering.

Figures 15, 16:
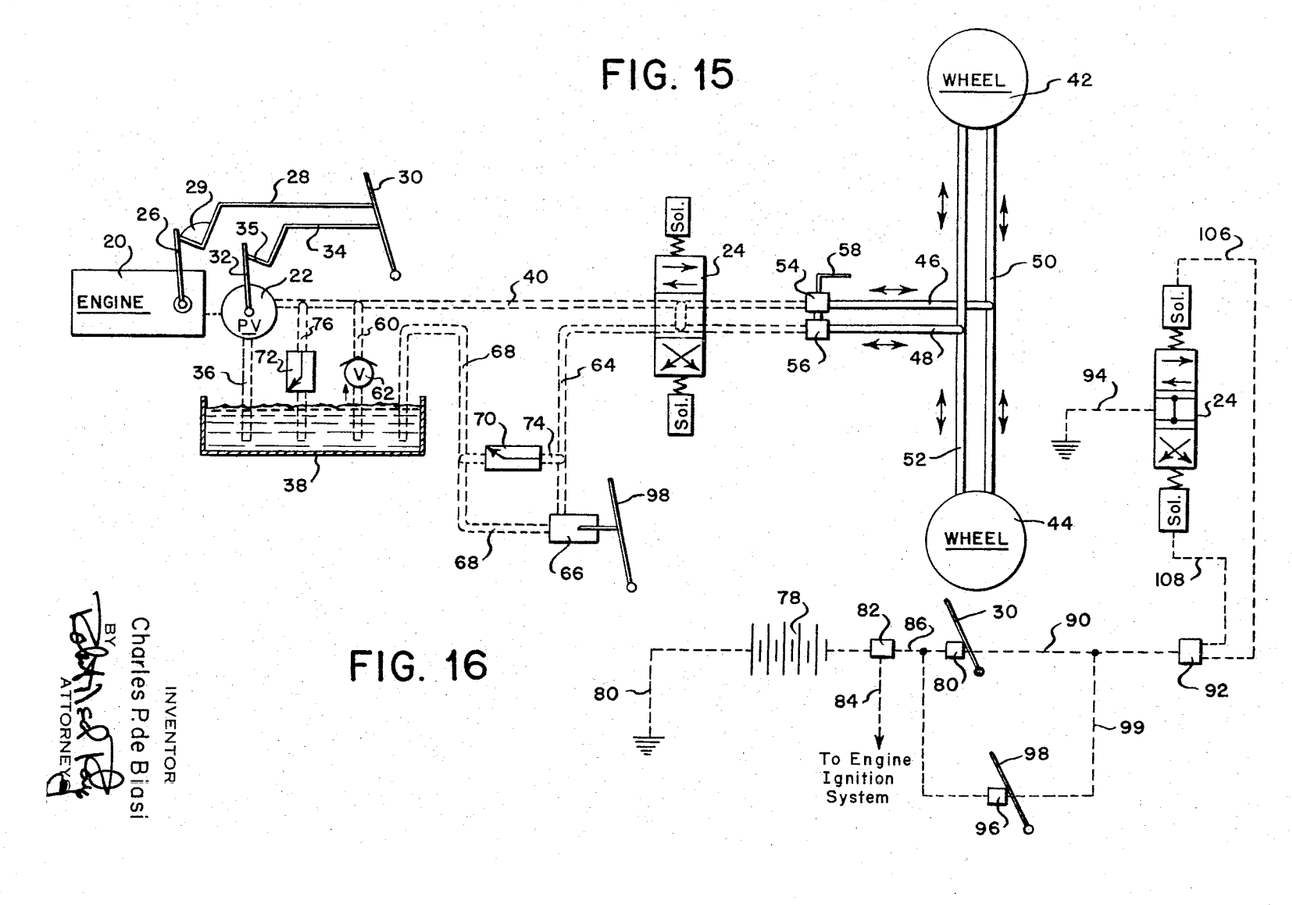
FIGURE 15 is a diagrammatic view similar to FIGURE 7, showing the hydraulic transmission components in a condition for a parked vehicle with the engine off.
FIGURE 16 is a diagrammatic showing of electrical control circuits correlated to and controlling the vehicle hydraulic transmission system when the vehicle is parked with the engine off as shown in FIGURE 15.
Figures 17, 18:
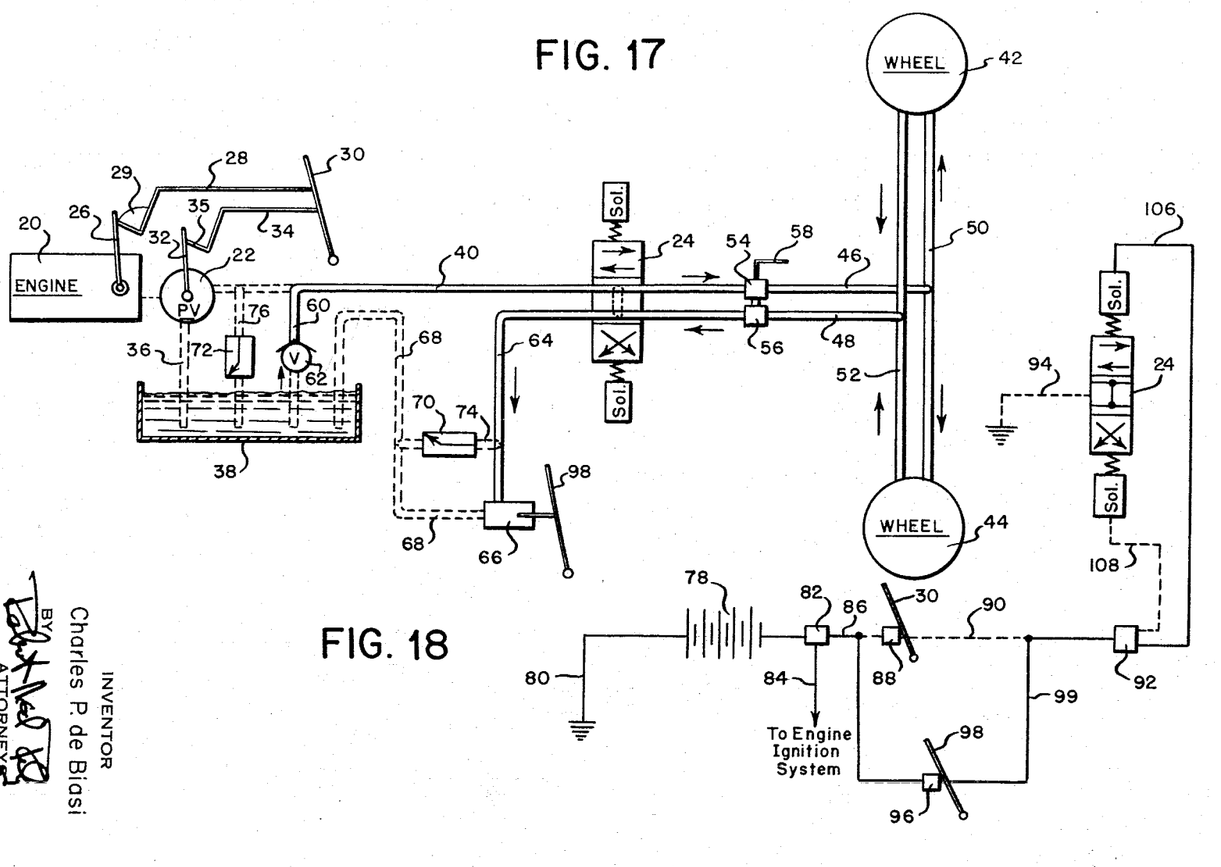
FIGURE 17 is a diagrammatic view similar to FIGURE 7, showing the hydraulic transmission components in a condition for a complete stop by means of foot-braking and with the engine still running.
FIGURE 18 is a diagrammatic showing of electrical control circuits correlated to and controlling the vehicle hydraulic transmission system when the vehicle is at a complete stop by means of foot-braking and with the engine still running as shown in FIGURE 17.

FIGURE 15 diagrammatically illustrates the hydraulic circuit of the instant system when the vehicle is parked with the engine off. In this condition, the orifice valves 54 and 56 are closed by manual actuation of the hand lever 58 to close the conduits 46 and 48 and cut off the wheels 42, 44 from the pump 22 and the reservoir 38. The orifice valves 54, 56 thus serve as a parking brake for the vehicle, since the wheels 42, 44 are part of a closed or "bottled" circuit and cannot turn in either the forward or reverse direction when these valves are closed.

Figures 9, 10:
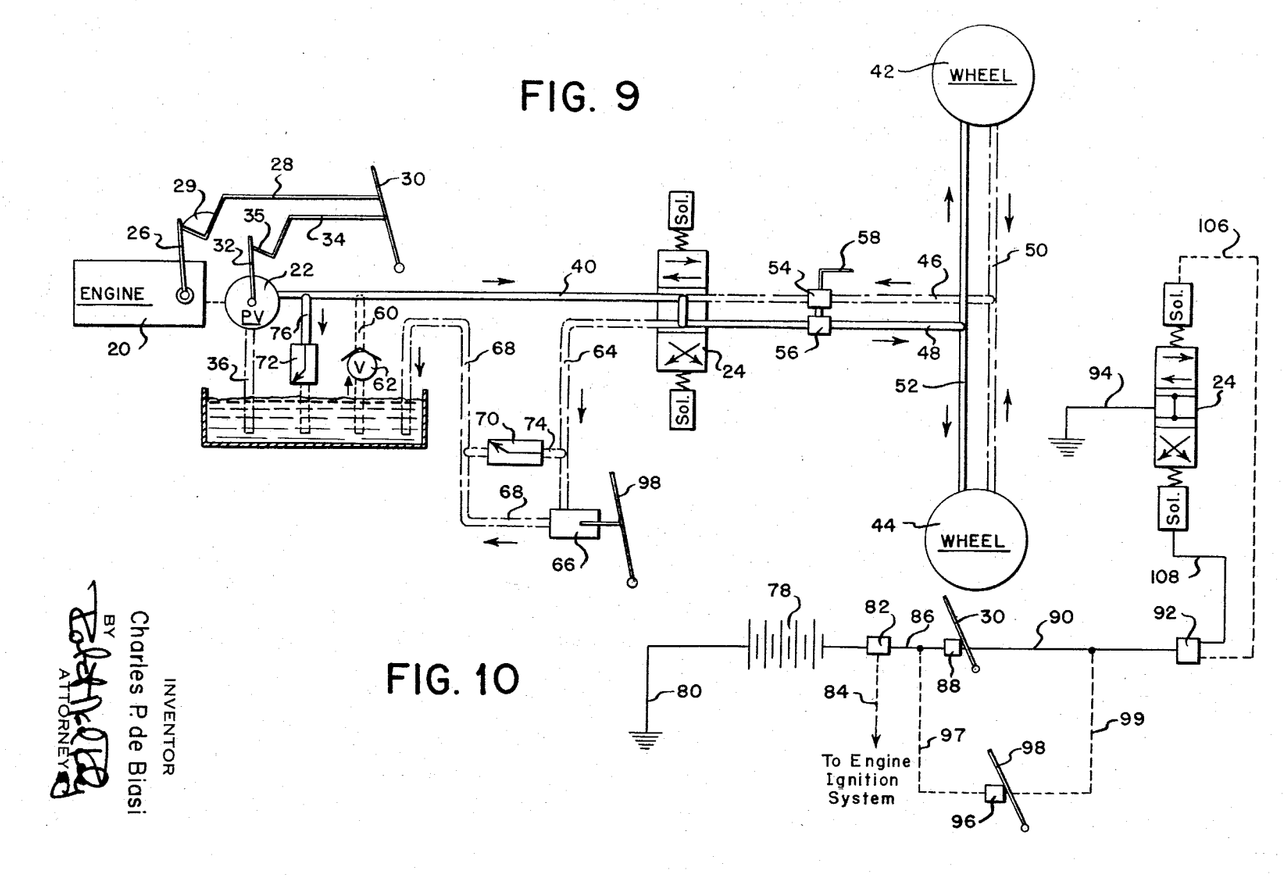
FIGURE 9 is a diagrammatic view similar to FIGURE 7, showing the hydraulic transmission components in a condition for reverse drive.
FIGURE 10 is a diagrammatic showing of electrical control circuits correlated to and controlling the vehicle hydraulic transmission system when the vehicle is in the reverse drive as shown in FIGURE 9.
Figures 11, 12:
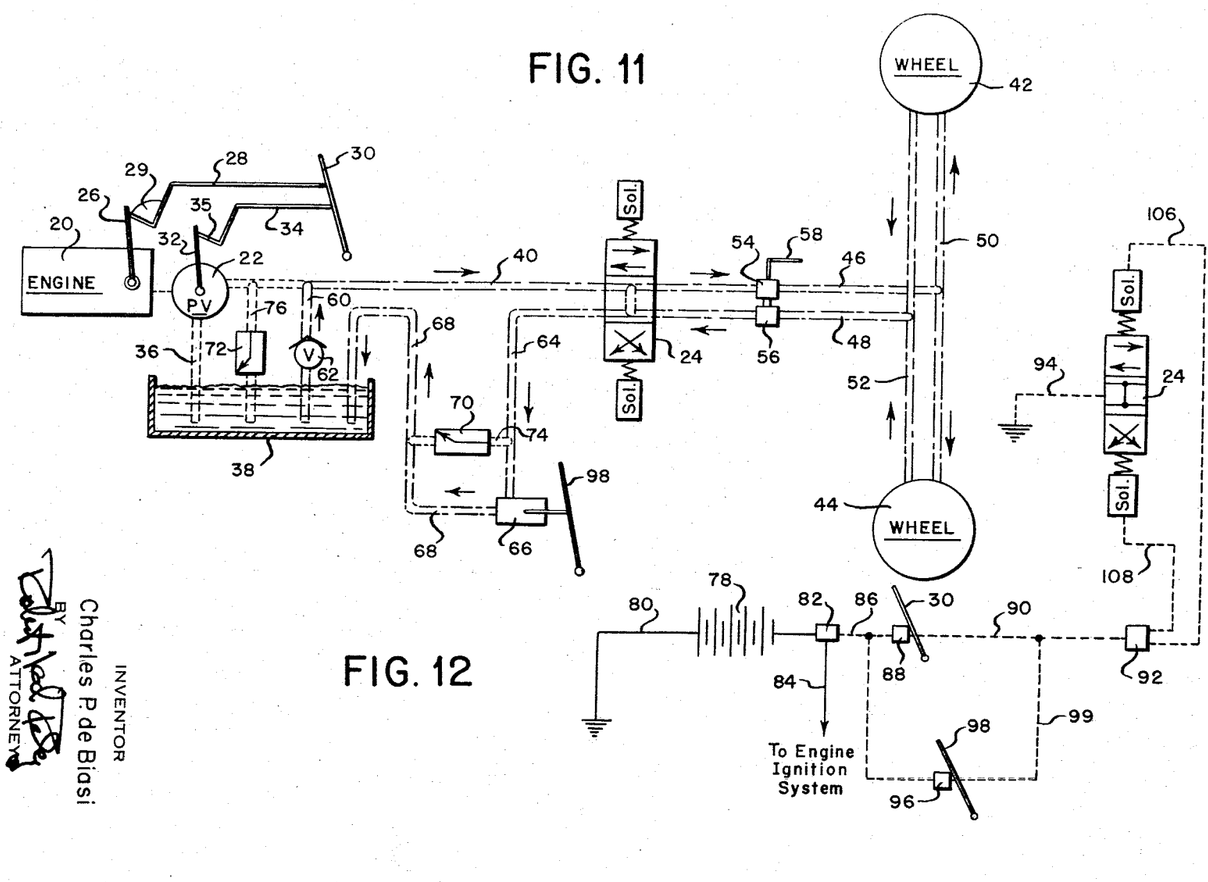
FIGURE 11 is a diagrammatic view similar to FIGURE 7, showing the hydraulic transmission components in a condition for coasting or free wheeling.
FIGURE 12 is a diagrammatic showing of electrical control circuits correlated to and controlling the vehicle hydraulic transmission system when the vehicle is in the coasting or free wheeling position as shown in FIGURE 11.

FIGURES 9 and 10 diagrammatically illustrate the hydraulic and electrical circuits of the instant system when the vehicle is in reverse drive. In this condition, the operator has actuated the manually operated switch 92 to close a circuit to the solenoid of the 4-way valve 24 opposite to the solenoid energized for forward travel. The fluid being pumped from the pump 22 toward the valve 24, therefore, is directed to the conduits 46 and 48 in an opposite direction of flow from the flow direction during forward movement of the vehicle. The wheels 42, 44 are thereby driven in an opposite direction to cause reverse travel of the vehicle. The acceleration and braking of the vehicle during reverse travel is effected in the same manner as that hereinbefore disclosed with respect to the forward travel of the vehicle.

From the above description and disclosure, it should be appreciated that there is herein described, disclosed, illustrated, and shown, various embodiments or modifications of a novel system, method, arrangement or apparatus for the propulsion of powered vehicles of any type, whether land, or amphibious, wheeled or endless track types, driven by means of a hydraulic fluid pressure transmission system employing a hydraulic pump and motors, which are all directly under the control of the operator and the energy demands required of the propulsion system.

While the invention has been described, disclosed, illustrated and shown in terms of certain preferred embodiments or modifications which it has assumed in practice, the scope of the invention should not be deemed to be limited by the precise embodiments or modifications herein shown, described, illustrated and disclosed, such other embodiments or modifications being intended to be reserved as they fall within the scope of the claims hereto appended.

What is claimed is:

1. In combination with a vehicle particularly adapted to be movable on wheels, endless tracks, boat hulls, and the like, having a prime mover comprising a throttle control lever;

hydraulic drive transmission comprising;
    a variable displacement pump driven by said prime mover, and comprising;
    a displacement control lever;
    said variable displacement pump directing the flow of a fluid in one direction, and being adjustable from a neutral non-pumping condition to conditions of variable pumping rates by said control lever;
    control means for simultaneously controlling said prime mover and said variable displacement pump, and comprising:
    cam means operatively associated with said throttle control lever for controlling the output of said prime mover; and lever means operatively associated with said displacement control lever for controlling the output of said pump;
manually actuatable means for causing the operation of said control means, and comprising:
a pivoted foot pedal;
at least one fluid operated motor for causing the forward and reverse movement of said vehicle;
a system of conduits connected between a fluid source, the pump and the motor for transmitting the fluid therebetween and for enabling the pump to drive the motor;
a valve arrangement disposed in said system of conduits between the pump and said fluid motor for directing the flow of fluid therethrough, and comprising:
a 4-way solenoid valve constructed and arranged to assume an open center position when in a neutral, non-actuated position;
actuating means for operating said valve arrangement to cause the fluid to flow through said system of conduits in a selective one of a plurality of predetermined paths, and comprising:
an electrical circuit having:
a source of energy comprising a grounded battery;
an ignition switch; and
a grounded manually operable double throw switch connected across the opposite solenoids of said 4-way solenoid valve;
means for energizing said valve actuating means, said energizing means being responsive to the actuation of the foot pedal of said manually actuatable means, and comprising:
a first electrical make-and-break contact switch;
manually operable braking means disposed in said system of conduits for interrupting the flow of fluid therein, and comprising:
a pivoted foot pedal; and
circuit closing means responsive to actuation of said manually operable braking means and operative to close the circuit to said valve arrangement, and comprising:
a second electrical make-and-break contact switch;
said first and second pedal actuated contact switches being connected in parallel relation in said electrical circuit;
said valve arrangement being connected in said electrical circuit, and the grounded battery and the ignition switch being connected in series relation with the parallel circuit of said first and second contact switches.

2. In combination with a vehicle particularly adapted to be movable on wheels, endless tracks, boat hulls, and the like, having a prime mover;
a hydraulic drive transmission comprising:
a variable displacement pump driven by said prime mover;
control means for simultaneously controlling said prime mover and said variable displacement pump;
manually actuatable means for causing the operation of said control means;
at least one fluid operable motor for causing the forward and reverse movement of said vehicle;
a system of conduits connected between a fluid source, the pump and the motor for transmitting a fluid therebetween and for enabling the pump to drive the motor;
a valve arrangement disposed in said system of conduits for directing the flow of fluid therethrough;
actuating means for operating said valve arrangement to cause the fluid to flow through said system of conduits in a selective one of a plurality of predetermined paths; and
means for energizing said valve actuating means, said energizing means being responsive to the actuation of said manually actuatable means;
said prime mover comprises:
a throttle control lever;
said variable displacement pump comprises:
a displacement control lever; and
said control means comprises:
cam means operatively associated with said throttle control lever for controlling the output of said engine; and
lever means operatively associated with said pump displacement control lever for controlling the output of said pump;
a manually operable braking assembly is disposed in said system of conduits for interrupting the flow of fluid therein;
said variable displacement pump is adapted to direct the flow of fluid in one direction, and is adjustable from a neutral, non-pumping condition to conditions of variable pumping rates by said throttle control lever; wherein:
said valve arrangement comprises:
a 4-way solenoid valve; wherein:
said valve actuating means comprises:
an electrical circuit having a source of energy;
said 4-way solenoid valve being connected in said electrical circuit; and wherein there is further provided:
circuit closing means for closing the circuit to said solenoid valve, and being responsive to actuation of said manually operable braking assembly.

3. The combination as defined in claim 2, wherein:
said manually actuatable means comprises:
a pivoted foot pedal; and wherein:
said energizing means comprises:
a first electrical make-and-break contact switch;
said valve being constructed and arranged to assume an open center position when in neutral, non-actuated position.

4. The combination as defined in claim 3, wherein:
said braking assembly comprises:
a pivoted foot pedal; wherein:
said circuit closing means comprises:
a second electrical make-and-break contact switch;
said valve being disposed in said conduit means between the pump and the fluid motor.

5. The combination as defined in claim 4, wherein:
said first and second pedal actuated switches are connected in parallel relation in said electrical circuit; wherein:
said electrical circuit comprises:
a grounded battery; and
an ignition switch;
said battery and switch being disposed in series relation with the parallel circuit of said first and second contact switches; and wherein there is further provided:
a manually operable double throw switch connected across the opposite solenoids of said 4-way solenoid valve.

6. A vehicle particularly adapted to be movable on wheels, endless tracks, boat hulls, and the like, comprising, in combination:
a propulsion engine having a throttle controllable by a manually operable cam;
a variable displacement pump driven by said engine, having intake and discharge ports and having the pump displacement controlled simultaneously with said throttle controlled engine by a manually operable cam and lever;
said manually operable cam and lever being operatively associated with a pivoted control foot pedal;
at least one fluid motor having intake and discharge ports and being drivable by said variable displacement pump;

a system of conduits connecting said pump and motor ports;

an electrically controlled valve arrangement in said system of conduits for directionally controlling fluid flow therethrough; and an electrical control circuit comprising a plurality of switches for controlling actuating of said electrically controlled valve arrangement;

said electrical circuit comprising an ignition switch for said engine disposed in series with said switches.

7. The vehcle as defined in claim 6, wherein there is provided:

manually operable valve means for closing said system of conduits between said fluid motor and said electrically controlled valve arrangement; and wherein:

said electrical circuit control switches comprise:

a pair of make-and-break contact switches in parallel with a double-throw switch, said double-throw switch being adapted to selectively condition said electrically actuated valve arrangement for effecting either forward, reverse, or neutral conditions of the vehicle.

8. The vehicle as defined in claim 7, wherein there is provided:

manually operable brake valve means for interrupting the flow of said fluid in said system of conduits, said valve means being disposed in said system of conduits in operative association with one of said contact switches; and relief valve means disposed across said brake valve means to protect the vehicle against excessive pressure during a braking operation by opening at a predetermined pressure.

9. The vehicle as defined in claim 8, wherein there is provided:

second relief valve means disposed in a branch conduit in operative association with said system of conduits to protect said pump against excessive pressure; and check valve means disposed in another branch conduit in operative association with said system of conduits for precluding flow between a portion of said system of conduits and a reservoir.

10. A hydraulic drive transmission for vehicles that are particularly adapted to be movable on wheels, endless tracks, boat hulls, and the like, having a prime mover comprising a throttled control lever, said transmission comprising in combination:

a variable displacement pump adapted to be driven by said prime mover;

control means for controlling said pump, and being adapted to simultaneously control said prime mover;

manually actuatable means for causing the operation of said control means;

at least one fluid operable motor adapted to cause the forward and reverse movement of said vehicle;

a system of conduits connected between a fluid source, the pump and the motor for transmitting a fluid therebetween and for enabling the pump to drive the motor;

a valve arrangement disposed in said system of conduits for directing the flow of fluid therethrough;

actuating means for operating said valve arrangement to cause the fluid to flow through said system of conduits in a selective one of a plurality of predetermined paths; and means for energizing said valve actuating means, said energizing means being responsive to the actuation of said manually actuatable means;

said variable displacement pump comprises:

a displacement control lever; and said control means comprises:

cam means adapted to be operatively associated with said throttle control lever for controlling the output of said engine; and lever means operatively associated with said pump displacement control lever for controlling the output of said pump;

a manually operable braking assembly is disposed in said system of conduits for interrupting the flow of fluid therein;

said variable displacement pump is adapted to direct the flow of fluid in one direction, and is adjustable from a neutral, non-pumping condition to conditions of variable pumping rates by said throttle control lever; wherein:

said valve arrangement comprises:

a 4-way solenoid valve; wherein:

said valve actuating means comprises:

an electrical circuit having a source of energy;

said 4-way solenoid valve being connected in said electrical circuit; and wherein there is further provided:

circuit closing means for closing the circuit to said solenoid valve, and being responsive to actuation of said manually operable braking assembly.

11. The hydraulic transmission as defined in claim 10, wherein:

said manually actuatable means comprises:

a pivoted foot pedal; and wherein:

said energizing means comprises:

a first electrical make-and-break contact switch;

said valve being constructed and arranged to assume an open center position when in a neutral, non-actuated position.

12. The hydraulic transmission as defined in claim 11, wherein:

said braking assembly comprises:

a pivoted foot pedal; wherein:

said circuit closing means comprises:

a second electrical make-and-break contact switch; and said valve is disposed in said conduit means between the pump and the fluid motor.

13. The hydraulic transmission as defined in claim 12, wherein:

said first and second pedal actuated switches are connected in parallel relation in said electrical circuit; wherein:

said electrical circuit comprises:

a grounded battery; and an ignition switch;

said battery and switch being disposed in series relation with the parallel circuit of said first and second contact switches; and wherein there is further provided:

a manually operable double throw switch connected to the opposite solenoids of said 4-way solenoid valve.

14. In a vehicle of the type having an operator's station a prime mover controlled by a swingable arm, a hydraulic drive transmission comprising a variable displacement pump driven by the prime mover and controlled by a swingable member, at least one fluid motor for causing forward and reverse movement of the vehicle, a system of conduits connected between a fluid source, the pump and the motor for transmitting a fluid therebetween and for enabling the pump to drive the motor, a valve arrangement disposed in the conduit system for directing fluid flow therethrough, actuating means for operating the valve arrangement to cause the fluid to flow through the conduit system in a selective one of a plurality of predetermined paths and means for energizing the valve actuating means, the improvement comprising:

control means for the prime mover and the pump having:

a manipulable element at the operator's station arranged for movement by the operator;

a first member carried by the manipulable element;

a cam mounted on the first member for engagement with the prime mover control arm and arranged to accelerate the prime mover through a substantial portion of movement of the manipulable element and to maintain a predetermined prime mover speed during continued movement of the manipulable movement after the substantial portion of pivotal element movement; and a second member carried by the manipulable element for engagement with the pump control member for manipulating pump displacement contemporaneously with engine control.

15. The vehicle of claim 14 wherein the second member of the control means is so configured and arranged to increase pump displacement during the accelerating portion of manipulable element movement and to decrease pump displacement during the continued movement of the manipulable element after the substantial portion of manipulable element movement.

16. In combination:
a prime mover having operating characteristics of an internal combustion engine;
a member associated with the prime mover for controlling the speed thereof;
a variable displacement pump driven by the prime mover;
a member associated with the pump for controlling the displacement thereof; and
control means comprising:
   a manipulable accelerator;
   structure associated with the prime mover control member for controlling the speed of the prime mover in response to manipulation of the accelerator, the structure being arranged to increase prime mover speed from an idling condition to a condition of predetermined speed as the accelerator moves from a first position to a second position and to maintain prime mover speed at the predetermined speed during continued accelerator movement from the second position to a third position; and
means associated with the pump control member for controlling the displacement of the pump in response to the manipulation of the accelerator, the means being arranged to increase pump displacement from a condition of minimum displacement to a condition of maximum displacement as the accelerator moves toward the second position and to decrease pump displacement during continued accelerator movement from the second position toward the third position.

17. The combination of claim 16 further comprising:
at least one fluid powered wheel; and
conduit means connecting the pump and the at least one wheel for driving the wheel in response to the fluid delivered from the pump.

18. The combination of claim 16 wherein
the means associated with the pump control member is arranged to provide zero displacement of the pump from the first accelerator position to a position intermediate the first and second positions.

References Cited

UNITED STATES PATENTS

| | | | |
|---|---|---|---|
| 2,774,436 | 12/1956 | Ferris | 60—19 X |
| 3,003,309 | 10/1961 | Bowers | 60—19 |
| 3,284,999 | 11/1966 | Lease | 60—19 |

EDGAR W. GEOGHEGAN, *Primary Examiner.*